March 15, 1960    R. W. STREHLOW ET AL    2,928,615
GRINDERS FOR FOOD WASTE AND LIKE MATERIALS
Filed Aug. 7, 1956    2 Sheets-Sheet 1
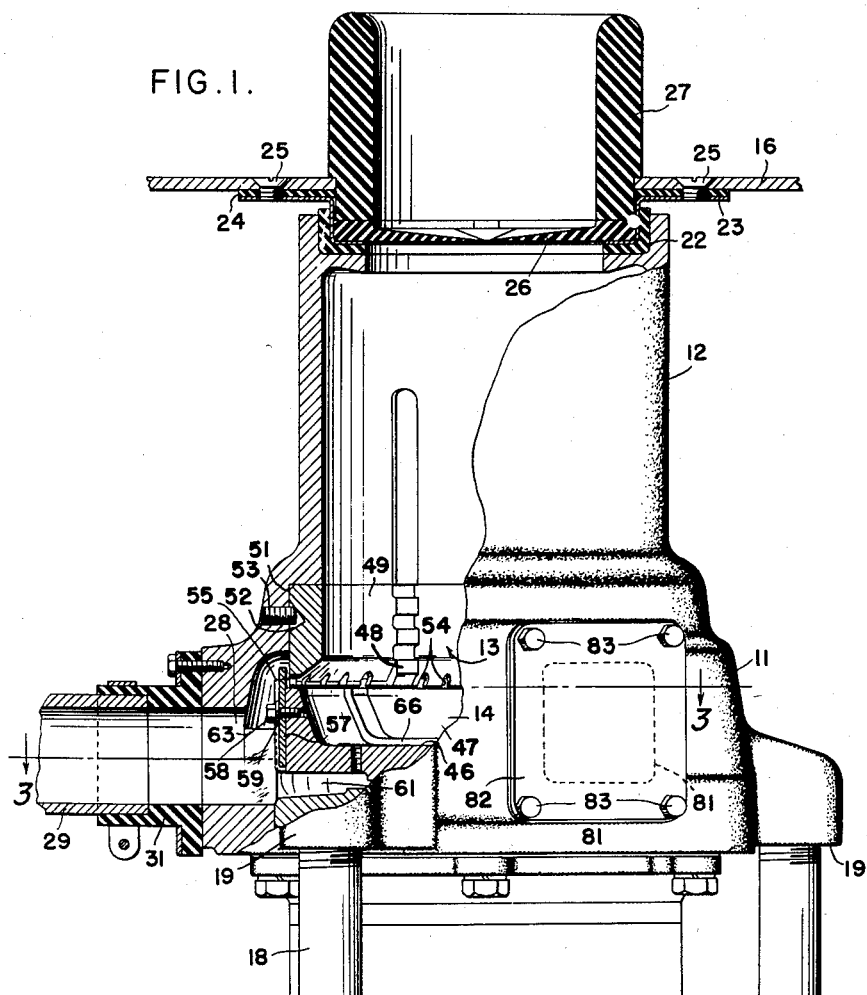
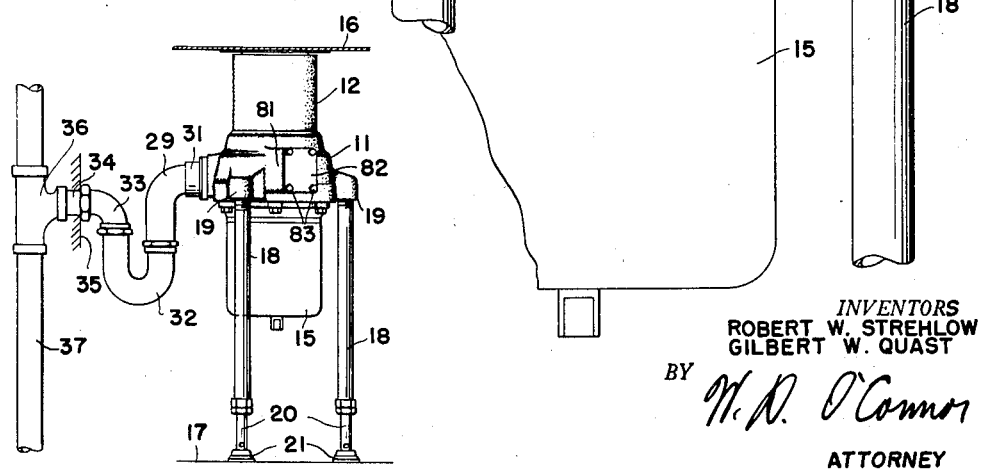
INVENTORS
ROBERT W. STREHLOW
GILBERT W. QUAST
BY
*W. D. O'Connor*
ATTORNEY March 15, 1960     R. W. STREHLOW ET AL     2,928,615
GRINDERS FOR FOOD WASTE AND LIKE MATERIALS
Filed Aug. 7, 1956     2 Sheets-Sheet 2

*INVENTORS*
ROBERT W. STREHLOW
GILBERT W. QUAST
BY *W. D. O'Connor*
ATTORNEY

United States Patent Office 2,928,615
Patented Mar. 15, 1960

2,928,615

GRINDERS FOR FOOD WASTE AND LIKE MATERIALS

Robert W. Strehlow, New Berlin, and Gilbert W. Quast, Brookfield, Wis., assignors to Chain Belt Company, Milwaukee, Wis., a corporation of Wisconsin Application August 7, 1956, Serial No. 602,580

15 Claims. (Cl. 241—100.5)

This invention relates generally to grinders and more particularly to improvements in grinders of the centrifugally operating type especially adapted for grinding food waste and materials of like nature.

It is a general object of the present invention to provide an improved grinder for food waste and like materials that is especially adapted for convenient mounting and that is arranged to facilitate maintenance when utilized in installations for the disposal of food waste and the like.

Another object of the invention is to provide an improved arrangement for mounting a food waste grinder beneath a sink or drain board for receiving waste materials therefrom.

Another object is to provide an improved waste materials grinder so arranged as to limit the pressure developed by the grinder in the disposal plumbing to obviate improper operation of the plumbing system.

Another object is to provide a waste grinder of the centrifugal type in which the cutting elements are arranged to be removable and replaceable.

A further object of the invention is to provide an improved grinder wherein the removable cutting teeth are readily accessible without dismantling the entire grinder.

The improved grinder for food waste and like materials to which the present invention is directed is of the type having a generally cylindrical vertically disposed feed stack open at its top and merging at its lower end into a grinding chamber. The bottom of the grinding chamber is formed by a bowl-shaped rotor that is arranged to be rotated about the vertical axis of the housing in a manner to whirl the material being ground in disintegrating engagement with stationary teeth in the housing.

According to the present invention, the grinder housing is supported upon three adjustable legs. By this arrangement, the grinder may be mounted on the floor beneath a sink or drain board in position to be connected with the drain line plumbing and may then be moved upward by adjusting the legs to bring its top opening into sealing engagement with a corresponding opening in the sink or drain board. In whirling the material ground in the grinder, the rotor operates somewhat as a centrifugal pump. To avoid building up excessive pressure in the drain line, the outlet opening of the grinder is provided with a re-entrant baffle arrangement whereby the discharge pressure may be controlled to limit the pressure in the drain line and thereby avoid causing the ground material to back up in the line. The inside of the bowl-shaped runner is provided with cutting teeth or driving lugs which are made removable and are secured in a novel manner whereby they may be replaced readily when their cutting edges become dulled. Access openings spaced about the grinding chamber and closed by cover plates provide ready accessibility for removing the screws which hold the cutting blades in the rotor bowl.

The foregoing and other objects of this invention will become more fully apparent as the following detailed description of an improved grinder constituting an exemplary embodiment thereof is read in conjunction with its representation in the accompanying illustrative drawings, wherein:

Figure 1 is a view generally in side elevation but partly in vertical longitudinal section with some parts broken away, and illustrating an improved grinder of the centrifugal type embodying the present invention;

Fig. 2 is a view in side elevation of the grinder shown on a smaller scale, and illustrating the manner in which it is mounted for use and connected with a drain line for receiving the ground material;

Fig. 3 is a plan view of the grinder, shown mostly in horizontal section taken substantially along the plane represented by the line 3——3 in Fig. 1, some parts having been broken away;

Fig. 4 is a fragmentary view in vertical section of part of the grinder, taken substantially along the plane represented by the line 4——4 in Fig. 3;

Fig. 5 is a fragmentary view in perspective of the interior of the grinder part shown in Fig. 4 and illustrating particularly the baffle arrangement at the discharge opening; and, Fig. 6 is an enlarged, exploded view in perspective showing a fragment of the grinder rotor presenting a tooth receiving slot and showing a tooth adapted to seat in the slot.

Referring more specifically to the drawings, and particularly to Figs. 1 and 2 thereof, the improved grinder or disintegrator for food waste material and the like shown therein by way of example, is of the vertical axis rotary or centrifugal type. The particular grinder illustrated is of the size and capacity adapted for the disposal of food waste material occurring in restaurants, institutional kitchens and like establishments, although it is to be understood that the improved features herein disclosed may be utilized in connection with grinders of various capacities and adapted for different uses.

The particular grinder structure shown as exemplifying a practical embodiment of the present invention is of the type disclosed in Patent No. 2,836,369 that issued May 27, 1958, on copending application Serial No. 418,014, filed March 23, 1954, of which this specification constitutes a continuation in part. As explained in the parent application, the grinder comprises essentially a generally cylindrical vertically disposed housing 11 that is open at its upper end and constitutes in its upper portion a feed stack or inlet hopper 12 which merges at its lower end into a grinding chamber 13. Within the lower part of the housing 11 a bowl-shaped rotor 14 that constitutes the moving element or runner of the grinder is mounted for rotation about the vertical axis of the housing, the rotor bowl being positioned to constitute the bottom of the grinding chamber 13. The rotor 14 is connected to be driven by an electric motor 15 which is secured to the lower end of and constitutes a downward extension of the cylindrical housing 11.

As indicated in Figs. 1 and 2, the grinder structure is installed for use beneath a sink or drain board 16, but with the entire weight of the apparatus being carried by a supporting surface such as a floor represented by the line 17, by means of three legs 18 rather than by the drain board itself. As appears in the drawing, each of the legs 18 may be in the form of a pipe or rod screwed into a complementary socket 19 formed on the lower end of the housing 11. In this instance, the sockets are indicated as being equally spaced in angular relationship about the housing, as shown in Fig. 3, although they may be spaced differently in other constructions. Each of the legs 18 has threaded into its lower end an adjusting stud 20 provided with a foot 21 of rubber or the like for engaging the floor 17, the arrangement being such that the grinder may be adjusted in vertical position by suitably turning the adjusting studs 20 in the ends of the several legs 18.

To provide for connecting the grinder to the sink or drain board 16, the upper end of the feed stack 12 in the housing 11 is counterbored to receive a resilient gasket 22 of L shape in cross section and formed of rubber or the like serving to minimize the transmission of vibration from the grinder to the drain board. A watertight connection is made with the lower surface of the drain board 16 by means of a metallic ring 23 presenting a radial flange and a depending cylindrical collar element. The ring or flange 23 is provided with a gasket 24 interposed between it and the drain board, the flange being secured to the drain board by screws 25. The metallic ring 23 is fastened in a position to register with the drain opening through the drain board 16 and is so arranged that the depending cylindrical part or collar element of the ring 23 may be received within the resilient gasket 22 in the top of the housing 11.

The installation of the grinder in operating position beneath the sink or drain board is effected without difficulty since after the collar 23 is secured in position, it is merely necessary to move the grinder under it with the gasket 22 in alignment with the depending cylindrical portion of the collar 23. The adjusting studs 20 in the lower ends of the legs 18 may then be turned to elevate the entire grinder structure in a manner to engage the gasket 22 with the collar 23 with sufficient pressure to form a watertight seal. By this arrangement, the entire weight of the grinder is carried by the floor 17 and no load is imposed upon the drain board 16 to support the grinder structure.

The material to be ground may be introduced into a feed opening in the top of the feed stack 12 from the drain board 16 through any suitable entrance arrangement preferably adapted to prevent material thrown upward from the grinding chamber 13 from splashing out through the feed stack opening. The particular entrance arrangement shown in Fig. 1 includes a shield or baffle 26 in the form of a feather ring or disc that fits within the collar 23 and is provided with radial slits to form deflectible fingers that bend to permit the entrance of the material into the feed stack 12. Above the shielding baffle 26 the collar 23 receives the lower end of a cylindrical rapping block 27 of resilient material that projects above the surface of the drain board 16 for receiving food waste material. The cylindrical block 27 fits loosely within the collar 23 and lies on equally spaced lugs which are part of the baffle 26. This permits drainage of water from the surface of the drain board 16 down between the outside of the block and the inside of the collar and then through the openings provided between the bottom of the collar and the upper face of the baffle from which it flows into the grinder. A sufficient additional quantity of water is furnished to the grinder to provide for assisting in the grinding operation and to flush away the ground material.

By reason of the previously explained mounting arrangement whereby the grinder is supported from the floor 17 on the three legs 18, the housing 11 may be adjusted angularly to bring an outlet opening 28 in one side thereof into alignment with plumbing connections for draining away the ground material. As shown in Fig. 2, the oulet 28 is aligned with drain piping represented by a downturned elbow 29 that is connected to the housing 11 by a resilient sleeve 31. The downturned elbow 29, in turn, connects with one leg of a trap 32 of generally U shape, the other leg of which is connected to another elbow 33. The second elbow 33 connects with a horizontal drain pipe 34 that is shown extending through a wall 35 and connected into a T-fitting 36 behind the wall that is interposed in a vertically disposed drain line 37, the lower end of which may be connected to a sanitary sewer or the like while the upper end is preferably vented to the atmosphere.

The details of construction of the grinder and its mode of operation in reducing waste material to a form suitable for discharging into the drain line 37 are more fully set forth and explained in the previously mentioned Patent No. 2,836,369. As there explained, the rotor 14, that constitutes the bottom of the grinding chamber 13 and is rotated by the driving motor 15, is of a novel bowl-like shape.

As best shown in Fig. 4, the driving motor 15 is provided with a vertically disposed driving shaft 41 to which the bowl shaped rotor 14 is locked by a key 42. The rotor 14 is further secured on the shaft and the key is held in place by a locking washer 43 which is fastened to the top of the shaft 41 by means of a machine screw 44 that is threaded into the upper end of the shaft. As shown in the drawings, the rotor 14 presents at its top a substantially flat disc-like central portion 46 that extends outwardly from the washer 43 and is in position to receive material dropped onto it through the feed stack 12. The flat disk-like portion 46 of the rotor is substantially equal in diameter to the internal diameter of the feed stack 12 and it blends at its outer edge into an upturned sloping rim portion 47 to constitute an impeller or moving element of generally bowl shape.

Material which falls on the central disc portion 46 is caused to whirl with the rotating impeller and is urged by centrifugal force outwardly into contact with the bowl rim 47 whereupon it moves upwardly along the sloping inner wall of the rim 47 in the form of a compacted rotating annulus having frictional driving engagement with the inner surface of the rim. As the annulus of material rotates with the rim 47 and moves upward past the upper edge of the bowl rim, it comes into rotary grinding engagement with inwardly projecting stationary disintegrating teeth 48 mounted within the grinding chamber 13 of the housing 11 and presenting cutting edges that operate upon the upper edge of the rotating annulus of the material being ground.

As explained in the previously mentioned patent, any tendency toward jamming the grinder is largely self-correcting since, if the speed of rotation of the rotor 14 is reduced, the centrifugal force is, likewise, reduced and the material rotating with the bowl rim tends to fall away from the cutting teeth 48, thereby clearing the jam and permitting the rotor to resume its normal speed. To this end, the inclination of the bowl rim 47 is such that the material will move gradually up the inner wall while being retained by centrifugal force in compacted condition against the rim wall for rotation therewith.

The stationary cutting teeth 48 that constitute the grinding elements which engage the material whirling with the rotor 14, are formed on the inner surface of a shredding or cutting ring 49 that encircles the grinding chamber 13. As shown in the drawing, the cutting ring 49 is removably mounted in an annular recess 51 machined in the lower end of the feed stack portion 12 of the housing 11. As appears in the drawing, the inner diameter of the cutting ring 49 is substantially equal to the inner diameter of the feed stack 12 in order that the inner surface of the ring may constitute the downward extension of the feed stack that forms the grinding chamber 13. The outer surface of the annular ring 49 is provided with a circumferential groove 52 arranged to receive the inner ends of a series of set screws 53 that are threaded through the side of the housing 11 to retain the ring in the annular recess 51. The cutting ring 49 is preferably formed of a suitable long-wearing material that lends itself to the formation of tough and abrasive resistant teeth 48. Should long continued use impair the cutting action of the teeth, the ring 49 may be readily removed from the annular recess 51 and replaced by a new ring presenting sharp teeth.

As best shown in Fig. 4, the lower outer edge of the cutting ring 49 is crenelated or notched to form a series of radially disposed discharge slots 54 which are of the proper size to admit outward passage of particles of material that have been ground to the desired degree of fineness. These radial slots 54 constitute in effect a particle screening or sizing device that permits the discharge of material after it has been ground to the proper size, but before it has been ground so fine as to form a sticky mass. At the same time, the slots 54 prevent the discharge of particles of larger size and retain them within the grinding chamber 13 for further grinding. To this end, the lower inner edge of the cutting ring 49 is beveled or chamfered to form a sloping surface inclined inwardly and upwardly from the inner ends of the slots 54.

By this arrangement, large particles of material rotating with and moving upward beyond the upper edge of the bowl rim 47 tend to continue their upward movement past the entrance ends of the slots 54 and are guided inwardly by the chamfered surface and away from the slots in a manner to prevent their being forcibly driven into the slot ends. At the same time, smaller particles of ground material are carried by the flushing water up and over the edge of the bowl rim 47 and are discharged outwardly through the radial slots 54. The inner edges of the discharge slots 54 constitute supplemental cutting elements which are engaged by some of the larger particles whirling with the upper edge of the bowl rim. The greater part of the disintegrating or grinding action, however, is effected by the inwardly projecting stationary teeth 48 that are engaged by the compacted particles whirling with and moving upward beyond the upper edge of the bowl rim 47. As these larger particles engage the cutting edges of the teeth 48, their rotary motion is interrupted and they lose the cohesive driving effect of the frictional forces established by the centrifugal compacting action. This causes the particles to be deflected from the bowl rim 47 and to fall back onto the central disc-like portion 46 in the bottom of the bowl 14.

As best shown in Fig. 5, the outer edge of the upturned rim 47 of the rotor 14 is provided with a raised peripheral ridge or outer lip 55. In the particular apparatus illustrated, the outer lip or ridge 55 extends upward about one eighth of an inch and runs in overlapping obstructing relationship with the lower part of the outer ends of the radial discharge slots 54 on the cutting ring 49. The particle size of the ground material being discharged from the grinder is thus determined by the size of the discharge opening remaining between the top edge of the lip 55 and the top edges of the partially obstructed outer ends of the slots 54.

In order that elongated or stringy particles passing outward through the slots 54 may be cut into shorter pieces for disposal, the outer raised lip 55 of the bowl 14 is notched to receive a series of upwardly extending bowl teeth or secondary cutting teeth 57. The cutting teeth 57 are angularly spaced about the bowl rim and extend upward beyond the upper edge of the lip 55 in overlapping relationship with the outer ends of the discharge slots 54 as best shown in Fig. 1. With the secondary cutting teeth 57 running in overlapping relationship with the outer ends of the discharge slots 54, any long or stringy particles of material moving outward through the slots 54 above the top edge of the lip 55 are sheared off by the teeth in passing the slot ends and are thereby cut into short lengths suitable for discharging through the drain line 37.

In the particular arrangement of the bowl 14 shown in the drawing, the secondary cutting teeth 57 are in the form of separate reversible and replaceable cutting elements of rectangular shape. The individual cutting elements or teeth 57 are preferably formed of a hard tough material such as tool steel that is especially resistant to both the abrasive effects and the shock loads encountered during grinding operations. As shown in the drawing, each cutting tooth 57 is received in its notch in the periphery of the bowl 14 and fastened to it by means of a retaining cap screw 58 secured by a lock washer 59. The teeth 57 being symmetrical in form are reversible on the bowl in such a manner that each may be secured in its notch in any one of four positions, thereby presenting four different cutting edges successively as each edge in turn becomes dulled with use. After the last edge has been dulled beyond further usefulness, the tooth may be removed and replaced by a new one.

The pieces of material clipped or sheared off by the secondary cutting teeth 57 together with the other particles of ground material flowing outward with the flushing water through the discharge slots 54 are thrown by centrifugal force tangentially from the periphery of the rotating bowl 14 into an annular discharge chamber 61. The discharge chamber 61 is formed in an enlarged lower part of the housing 11 and is disposed outwardly of and encircles the rotating bowl 14. The outlet passageway 28 to which the drain line plumbing is connected leads directly from the discharge chamber 61 through the side wall of the housing 11.

Because of the centrifugal action resulting from rotation of the rotor 14 within the annular discharge chamber 61, the grinder operates to some extent as a centrifugal pump and the material thrown tangentially from it develops some fluid pressure within the discharge chamber. This pressure, although relatively small, tends to increase the flow of the ground material out through the discharge opening 28 and through the plumbing connections into the drain line 37. Under some circumstances this pumping action may result in forcing material into the drain line 37 at a rate faster than it will normally flow through the drain pipe. Should the flow of ground material become excessive to the extent that it cannot drain down through the pipe 37 as rapidly as it is being forced through the trap 32, the material may back up in the pipe 37 with the result that some of it may flow upward into the portion thereof above the T-fitting 36. If this condition continues, some of the ground material will eventually escape through the vent or through other plumbing connections leading into the same drain line 37. Even through the ground waste material does not back up into the upper portion of the pipe 37 to any great extent, some of whatever material is forced up into this part of the pipe may settle on the walls and this may result eventually in clogging the pipe thereby interrupting its venting function and interfering with downward flow through the pipe from other plumbing connections.

In accordance with the present invention, this difficulty is overcome through reducing the fluid pressure and consequently the rate of flow of the ground material through the outlet opening 28. To accomplish this, the inner or entrance end of the opening 28 is provided with what may be termed a re-entrant pressure limiting arrangement whereby the clearance space between the periphery of the rotating bowl 14 and the entrance to the outlet opening 28 is reduced to an extent that limits the rate of outward flow of ground material. To this end, a pair of vertically disposed baffle walls 63 are arranged in parallel spaced relationship at the respective edges of the opening 28 in a manner to extend inwardly therefrom almost to the periphery of the rotor 14, as best shown in Fig. 4. As shown in the perspective view in Fig. 5, the baffle walls extend upwardly from the bottom of the discharge chamber 61 about two thirds of the way to the top of the opening 28.

As shown in Figs. 3 and 5, the spaced parallel baffle walls 63 constitute the end faces of wedge-shaped blocks 64 that are preferably cast integrally with the housing 11. The inner surfaces of the wedge blocks lie in a chordal plane along the side of the annular discharge chamber 61 and extend in both directions from the opening 28. The upper surfaces of the wedge blocks 64 lie in a substantially horizontal plane and are formed low enough to provide clearance above them for movement of the heads of the cap screws 58 which retain the removable cutting teeth on the periphery of the bowl 14. Although the baffle walls 63 do not appear to block the discharge opening 28 appreciably, they do serve to reduce the centrifugal pumping action of the lower peripheral edge of the rotor 14 in turning in the annular discharge chamber 61 since they limit the amount of material carried tangentially by the rotor into the region of the discharge passageway 28. This limitation of the pumping action has been found in practice to be sufficient to limit the rate of flow through the discharge opening or outlet 28 to that which can be readily accommodated by the connected plumbing exemplified by the trap 32 and drain line 37 shown in Fig. 2.

By modifying the shape and position of the baffle walls 63, the extent of the pressure reducing action can be regulated as desired to provide more or less pressure and correspondingly more or less flow through the outlet opening 28. Experience has shown that the pressure can be reduced in this manner to the extent that the rate of flow is entirely insufficient to dispose of the ground material. Then by changing the shape of the re-entrant baffling, the rate of flow can be increased to the degree required for efficient operation without overloading the drain pipe system. Furthermore, the baffle walls need not necessarily be parallel since a circular re-entrant wall constituting an inward extension of the circular outlet has been found to operate in the same manner with equal effectiveness.

As previously mentioned, the material to be ground is introduced through the rapping block 27 and falls through the feed stack 12 onto the central disc portion 46 of the rotating bowl 14. In order to impart the rotary or whirling motion of the bowl to the material dropped into it, the bowl is provided on its inner surface with a pair of diametrically disposed driving vanes or primary cutting teeth 66. As best shown in Figs. 3 and 6, these ribs or cutting teeth 66 project outwardly in opposite directions from positions adjacent to the edge of the washer 43 at the center of the bowl 14. Referring to Fig. 4, it may be seen that the ribs 66 extend radially from the washer 43 to the rim 47 and then extend upwardly along the inner surface of the rim to its upper edge.

As shown, the ribs 66 project upward from the surface of the central disc portion 46 only a comparatively small amount in order that large objects being ground may drop down into the grinding chamber as far as possible. When such large objects are encountered, the cutting teeth 66 rotating in contact with the lower ends thereof act as grinding elements that cut away portions of the objects until they are small enough to be whirled and tumbled within the grinding chamber in grinding engagement with the stationary cutting teeth 48. Furthermore, the upper ends of the vanes or cutting teeth 66 act as grinding or shearing teeth in cooperation with the lower ends of the stationary cutting teeth 48. In addition to operating as impellers for whirling the material within the bowl and as grinding teeth, the ribs or cutting teeth 66 further serve as pumping vanes that operate to eject the flushing water and ground particles of material from the central disc 46 of the bowl outwardly and upwardly over the top edge of the rim 47 and through the discharge slots 54.

Since these vanes or primary cutting teeth 66 are subjected to wearing action in operating on the material to be ground, they are preferably formed of hard and tough wear-resisting material and are made removable and replaceable in order that the cutting edges may be renewed after considerable use by substituting new teeth for the worn ones. As appears in Figs. 3 and 6, the cutting teeth 66 are of generally rectangular cross section and are each fitted in a complementary rectangular slot 67 formed in the surface of the central disc-like portion 46 of the rotor 14. The slot may be formed by means of a rotating milling cutter or the like which is moved radially outward from the center of the bowl to prepare a kerf or groove having a flat bottom and presenting parallel sides to receive the tooth 66. In cutting the slot 67 the rotating cutter is preferably fed outwardly until it cuts into the bowl rim 47, the cut continuing until substantially halfway through the rim and terminating in a vertically disposed semicylindrical end face 68 best shown in Fig. 6. As appears in the drawing, the bottom face of the tooth 66 is formed flat to fit the bottom of the slot 67 while the upturned outer end of the tooth is formed to present a semicylindrical contour that seats in the concave outer end 68 of the slot. Since it is difficult to form the outermost face of the tooth 66 with a sufficient degree of accuracy to fit exactly in the semicylindrical end 68 of the slot 67, it is preferable to form the semicylindrical end of the tooth to a radius slightly shorter than the radius of the slot end. This permits the end of the tooth to seat in the trough of the semicylindrical slot end without any tendency to impose side forces on the tooth.

As shown in Fig. 4, the tooth 66 is drawn into and secured in position by a horizontally disposed headed cap screw 70 that extends through a radial opening in the wall of the bowl and is threaded into a threaded opening or tapped hole in the outermost end of the tooth 66. When the cap screw 70 is tightened, the semicylindrical end of the tooth is drawn into seating engagement with the trough of the vertical semicylindrical end 68 of the slot 67, thereby securing the tooth rigidly in position. A lock washer 71 is employed under the head of the cap screw 70 to lock it in the tightened position.

The inner end of the cutting tooth 66 is held down by another cap screw 72 that passes through and is countersunk in a vertical hole 73 in the tooth, the screw being threaded into the central disc portion 46 of the bowl 14. The hole 73 in the tooth is lightly larger than the cap screw 72 to provide sufficient lost motion to permit the cap screw 70 to draw the tooth 66 endwise into seating engagement with the semicylindrical slot end 68 without interference from the cap screw 72. Thus, in tightening the tooth 66 in position, the cap screw 70 is first drawn up tight to position the tooth longitudinally after which the cap screw 72 is tightened to hold the inner end thereof down in seating relationship with the slot 67.

In removing one of the teeth 66 for replacement, the cap screw 72 is first removed from the hole 73. Then the cap screw 70 is loosened and unscrewed part-way from the tapped hole in the tooth. The head of the cap screw 70 may then be struck a sharp blow to dislodge the tooth from seating engagement with the semicylindrical slot end 68 and move it inwardly of the bowl 14. As the tooth moves inwardly, an upwardly inclined cam face 75 on the lower side of the inner end of the tooth engages and rides up on the edge of the central washer 43, thereby lifting the tooth 66 from the slot 67 to free it for removal from the bowl. The cap screw 70 is then removed completely from the threaded opening in the tooth whereupon the tooth may be lifted out through the feed stack 12.

As shown in Fig. 3, the bowl 14 is provided with two diametrically opposed primary cutting teeth 66. Intermediate the cutting teeth 66, the bowl is provided with two diametrically opposed auxiliary primary teeth 76 that are generally similar in shape to the upper ends of the teeth 66. As shown in the drawing, the auxiliary teeth 76 fit in semi-cylindrical vertical slots 77 which extend from the top edge of the bowl rim 47 downward about halfway to the surface of the central disc 46. The outermost faces of the auxiliary teeth 76 are formed semicylindrical on a radius slightly smaller than the radius of the slots 77 to provide for seating therein in the same manner that the outermost faces of the teeth 66 seat in the semicylindrical slot ends 68. A headed cap screw 78 fitted with a lock washer 79 beneath its head, extends horizontally through the rim 47 and is threaded into a tapped hole in each tooth 76 for holding it firmly within the slot 77 with its adjacent inner face projecting inwardly a small amount to present grinding edges. The several cap screws 58, 72 and 78 which hold the removable teeth on the bowl rim 47 are positioned at substantially the same elevation about the bowl rim whereby the projecting heads thereof pass above the top surfaces of the wedge blocks 64 which form the baffle walls 63 adjacent to the outlet opening 28.

In order that the cutting teeth may be removed and replaced without dismantling the entire machine, the lower part of the housing 11 is provided with two access openings 81 that are spaced angularly with reference to the outlet opening 28 in such a manner that one or the other of the openings 81 will be readily accessible regardless of the position in which the grinder is mounted. As shown in Figs. 1 and 3, each of the access openings 81 is covered by an inspection plate 82 of square shape that is held on the outside of the housing 11 by means of cap screws 83 in its respective corners. Thus, with the grinder mounted in operating position as shown in Fig. 2, the most readily accessible inspection plate 82 may be removed in order that a wrench may be inserted through the opening 81 to engage and turn one or another of the cap screws on the bowl. To remove one of the auxiliary teeth 76, for example, the bowl 14 may be turned manually to bring the tooth into alignment with the uncovered access opening 81. The cap screw 78 may then be loosened with a wrench, then struck to loosen the tooth 76 after which the screw is removed through the access opening and the tooth is removed from inside the bowl through the feed stack 12. In the case of one of the secondary teeth 57, the cap screw 58 may be removed as before and the tooth 57 then removed through the access opening 81. After new teeth have been secured to the bowl as required to replace any that have been worn or damaged and the cap screws tightened by a wrench operating through the access opening 81, the inspection plate 82 may be replaced and secured by its cap screws 83 whereupon the machine is ready to resume operation without the necessity of reassembling and readjusting its component parts.

From the foregoing explanation of the construction and operation of the improved grinder set forth herein by way of example, it will be apparent that the present invention has provided a new, more efficient and convenient construction for a disintegrator of the bowl type adapted for the grinding and disposal of food waste and like materials.

Although a specific example of the improved grinder apparatus embodying the present invention has been set forth in detail for the purpose of completely disclosing a practical and useful embodiment of the invention, it is to be understood that various other arrangements of the elementary parts of the apparatus may be effected by persons familiar with this art without departing from the spirit and scope of the invention as defined in the subjoined claims.

The invention having now been fully described what is claimed is:

1. In a grinder or the like, a generally cylindrical vertically disposed housing open at its upper end to constitute a material receiving feed stack that merges at its lower end into a grinding chamber provided at one side with an outlet opening for the discharge of ground material, a grinding rotor mounted in said grinding chamber for rotation about the vertical axis of said housing and operating to discharge ground material outwardly through said outlet opening by centrifugal action said rotor presenting screw receiving openings about its periphery, a pair of baffle walls extending in parallel relationship inwardly from the respective sides of said outlet opening toward the periphery of said grinding rotor for reducing the rate of discharge of the ground material through said opening, removable and renewable cutting teeth carried by said grinding rotor, and cap screws having heads and extending from the periphery of said rotor inwardly through said screw receiving openings to secure said teeth to said rotor, said heads of said screws protruding from said rotor periphery in a position to pass above the tops of said baffle walls when said rotor is turning during a grinding operation.

2. In a grinder for food waste and like materials, a generally cylindrical vertically disposed housing open at its upper end to constitute a material receiving feed stack that merges at its lower end into a grinding chamber, a runner of bowl shape mounted in said grinding chamber and adapted for rotation about the vertical axis of said housing, said runner comprising a central disc-like element merging at its outer edge into an upturned peripheral rim and having a pair of tooth-receiving slots extending radially in opposite directions from near the center of said disc-like element outwardly to said rim and then upwardly therealong to the top of said rim, a pair of cutting teeth constituting driving lugs removably mounted in said slots respectively, said teeth being shaped to project slightly upwardly from the inner surface of said disc-like central element and slightly inwardly from said upturned rim of said bowl to also operate as pumping vanes, and releasable fastening means arranged to retain said removable cutting teeth in said slots.

3. In a grinder for food waste material and the like, a grinding rotor of generally bowl shape having an upturned rim, said upturned rim being recessed in its inner surface to constitute an axially extending slot defined by parallel side faces joined at their outermost edges by an axially disposed wall element, a removable and renewable grinding blade arranged to fit in said slot with its outermost face seated against said axially disposed wall element and with its adjacent inner face projecting inwardly from said slot to present an exposed grinding element, and a retaining screw extending through said upturned rim and threaded into said outermost face of said grinding blade to retain said grinding blade in said slot.

4. In a grinder for food waste material and the like, a grinding rotor of generally bowl shape having an upturned rim, the inner surface of said rotor bowl presenting a parallel sided radially disposed slot that terminates in said upturned rim with its outer end formed by a vertically disposed semi-cylindrical wall extending between said parallel sides and upward to the top edge of said rim, a grinding blade shaped to fit said radially disposed slot and said semi-cylindrical outer end thereof, said blade projecting upward from said inner surface of said bowl to present an exposed grinding element, and fastening means arranged to retain said blade in said slot.

5. In a grinder for grinding food waste material and the like, a vertically disposed generally cylindrical housing constituting a material receiving stack terminating at its lower end in a grinding chamber and provided with a discharge opening extending radially outward from one side of said grinding chamber, a grinding rotor mounted for rotation about the vertical axis of said housing within said grinding chamber and in the transverse plane of said discharge opening, and a pair of abutments projecting inwardly at the respective sides of said discharge opening from the interior surface of said cylindrical housing in the transverse plane of said rotor and constituting in effect an inward extension of the walls of the lower portion of said discharge opening, said abutments extending into said grinding chamber toward and to within close proximity of the periphery of said grinding rotor, the arrangement being such that said abutments restrict the flow of ground material into said discharge opening thereby limiting the rate of discharge of ground material from said grinding chamber.

6. In a grinder for food waste and like materials adapted for use with a drain board or the like presenting a discharge opening, a flange ring provided with a depending cylindrical collar and a radial flange adapted to be secured to the lower surface of the drain board in register with the discharge opening therein, a grinder housing presenting a waste receiving feed stack recessed at its upper end to receive and encircle said cylindrical collar depending from said flange ring on the lower surface of the drain board, adjustable legs disposed to support said grinder housing on the floor beneath the drain board in adjusted vertical position, and a resilient gasket of L-shape in cross section interposed between said recessed upper end of said housing and the outer periphery and lower edge of said depending cylindrical collar, the arrangement being such that said grinder housing may be adjusted angularly relative to the drain board by turning it about said cylindrical collar and may be raised into tight engagement with said collar by adjusting said adjustable legs to cause said resilient gasket to be compressed against the lower edge of said collar thereby effecting a watertight connection with said drain board discharge opening.

7. In a grinder for food waste material and the like, a generally cylindrical vertically disposed casing open at the top to form a material receiving stack and terminating at its lower end in a grinding compartment, a grinding rotor of generally bowl shape presenting an upturned rim and rotatably mounted on a vertical axis in said grinding compartment, said rotor rim being recessed on its inner surface to constitute a generally rectangular slot vertically disposed and with its outermost side of semi-cylindrical shape, a removable and renewable grinding tooth adapted to fit into said vertically disposed slot with one face thereof shaped to conform with and seated in said semi-cylindrical side of said slot in a manner to resist centrifugal force when said rotor is rotating and the opposed face thereof projecting from said slot to provide a material grinding element, and means engageable from the exterior of said bowl rim and operative to secure said grinding tooth in seated engagement with said semicylindrical recess.

8. In a grinder for food waste material and the like, a housing constituting a material receiving and grinding chamber, a grinding element of generally bowl shape presenting an upturned rim and rotatably mounted within said grinding chamber, said bowl-shaped element presenting in its inner surface a radially disposed slot that terminates in said upturned rim with its sides joined by a semi-cylindrical axially disposed outer end, a cutting blade presenting a semicylindrical outer end complementary to said semicylindrical outer end of said radially disposed slot, said blade being adapted to fit in said radial slot in said grinding element, and means to retain said blade in said slot with said semicylindrical outer end of said blade in close engagement with said axially disposed semi-cylindrical outer end of said slot.

9. In a grinding apparatus of the waste disposal type, a generally cylindrical housing open at the top to receive material to be ground and provided on its interior surface with cutting teeth there being a discharge opening in the side thereof near the bottom, a grinding rotor mounted within said cylindrical housing in the region of said discharge opening, power actuated means operatively connected to rotate said rotor within said housing in a manner to whirl material fed through said top opening into engagement with said cutting teeth on the interior surface of said cylindrical housing, and a pair of baffle walls extending inwardly from the interior surface of said cylindrical housing toward and almost to the lower peripheral edge of said grinding rotor at the respective sides of said discharge opening, said baffle walls being disposed in position to reduce the pumping action of said rotor in discharging ground material through said discharge opening, whereby the pressure exerted by the ground material passing through said discharge opening may be maintained below that which might be objectionable in plumbing leading therefrom.

10. In a grinder for food waste material and the like a grinding rotor of generally bowl shape having an upturned rim, said upturned rim being recessed in its inner surface to constitute an axially extending slot defined by parallel side faces joined at their outermost edges by a semi-cylindrical wall element, a removable and renewable grinding blade arranged to fit in said slot with its outermost face seated in said semi-cyclindrical wall element and with its adjacent inner face projecting inwardly from said slot to present an exposed grinding element, and fastening means operative to retain said grinding blade in said slot.

11. In a grinder for food waste and like materials, a generally cylindrical vertically disposed housing open at its upper end to constitute a material receiving feed stack and merging at its lower end into a grinding chamber provided at one side with an outlet opening for discharging ground material, a grinding rotor mounted in said grinding chamber for rotation about the vertical axis of said cylindrical housing and operating to discharge ground material outwardly through said outlet opening said rotor presenting about its periphery a series of screw receiving openings, a plurality of removable and renewable cutting teeth carried by said grinding rotor, headed cap screws extending through said screw receiving openings with the heads thereof projecting outward from the periphery of said rotor said screws serving to secure said teeth to said rotor, and baffle walls extending inwardly from the respective sides of said outlet opening toward said rotor periphery for reducing the pumping action of said rotor upon the ground material being discharged through said outlet opening, said baffle walls extending upward from the lower edge of said opening to a position just below the path of movement of said heads of said cap screws when said rotor is turning.

12. In a grinder for food waste and the like adapted for use with a sink or drain board presenting a discharge opening, a flange provided with a depending cylindrical collar and adapted to be secured to the lower surface of the sink or drain board in register with the discharge opening therein, a grinder housing presenting a waste receiving feed stack recessed at its upper end to receive and encircle said depending cylindrical collar on the lower surface of the sink or drain board, adjustable legs disposed to support said grinder housing on the floor beneath the sink or drain board in adjusted vertical position, and a resilient gasket of L-shape in cross section interposed between said recessed upper end of said housing and the periphery and lower edge of said cylindrical collar, the arrangement being such that said grinder housing may be adjusted angularly by turning it relative to said cylindrical collar and may be raised by adjusting said adjustable legs to compress said resilient gasket against the lower edge of said cylindrical collar and thereby effect a watertight connection with said collar.

13. In a grinder for food waste and like materials, a runner of bowl shape arranged for rotation about a vertical axis, said runner comprising a disc-like element presenting an upturned peripheral rim with its inner surface slopping outwardly to constitute a bowl, the interior surface of said runner bowl presenting a radially disposed slot extending outwardly from the center of said runner and terminating in said upturned rim with its outer end in the form of a vertically disposed semi-cyclindrical wall extending upwardly from the bottom of said slot to the top edge of said upturned rim, a removable grinding blade shaped to fit in said radially disposed slot and extending radially outwardly therein to said rim and then upwardly within said terminal semi-cylindrical portion to the top of said rim with its upper end constituting a cutting tooth, said blade projecting from said interior surface of said bowl sufficiently to present an exposed grinding element and having its outer end seated against said vertical semi-cylindrical wall in a manner to resist centrifugal force when said runner is rotating, fastening means arranged to releasably retain said blade in said slot, and complementary cutting elements disposed in cooperating relationship with said bowl rim, whereby when said grinder is operating material deposited in said bowl-shaped runner is engaged by said removable grinding blade in a manner to be whirled thereby and urged by centrifugal force outwardly and upwardly along said sloping inner surface of said upturned rim into grinding engagement with said cooperating complementary cutting elements.

14. In a grinder for food waste and like materials, a vertically disposed generally cylindrical housing open at its upper end to constitute a material receiving feed stack and merging at its lower end into a grinding chamber closed at the bottom and provided at one side with a radially disposed outlet opening for discharging ground material, a grinding rotor mounted in said grinding chamber for rotation about the vertical axis of said cylindrical housing and operating by centrifugal pumping action to discharge ground material outwardly through said radially disposed outlet opening, and baffle walls extending inwardly from the respective sides of said radially disposed outlet opening toward the periphery of said rotor and extending upwardly from the lower edge of said opening about two-thirds of the way to the upper edge of said opening for reducing the pumping action of said rotor upon the ground material being discharged thereby through said outlet opening to limit the rate of discharge of the material.

15. In a grinder for food waste and like materials, a vertically disposed generally cylindrical housing open at its upper end to constitute a material receiving feed stack that merges at its lower end into a grinding chamber, a runner of bowl shape mounted in said grinding chamber for rotation about the vertical axis of said housing, said runner comprising a central disc-like element merging at its outer edge into an outwardly inclined upturned peripheral rim and presenting a plurality of tooth-receiving slots extending radially outward from near the center of said disc-like element to and upwardly along said rim, a cutting tooth constituting also a driving lug removably mounted in each of said slots respectively, said teeth being shaped to fit in said slots and project above the inner surface of said bowl-shaped runner to present cutting edges and to operate also as pumping vanes the inner end of each tooth being shaped on its lower side to present an upwardly inclined cam face adapted to act as a wedge to lift said tooth from said slot when said tooth is moved radially inward toward the center of said runner, and releasable fastening means arranged to retain each of said teeth in its radially outward position in its slot during operation of the grinder said fastening means also serving when released to facilitate radially inward movement of said tooth in order that said cam face at its inner end may operate to lift said tooth from said slot.

References Cited in the file of this patent
UNITED STATES PATENTS

| | | |
|---|---|---|
| 2,360,357 | Marshall | Oct. 17, 1944 |
| 2,579,400 | Schindler | Dec. 18, 1951 |
| 2,630,918 | Janows | Mar. 10, 1953 |
| 2,676,759 | Strehlow | Apr. 27, 1954 |
| 2,730,308 | Jordan | Jan. 10, 1956 |
| 2,767,927 | Green | Oct. 23, 1956 |
| 2,784,914 | Powers | Mar. 12, 1957 |